V. G. APPLE.
POWER TRANSMISSION DEVICE.
APPLICATION FILED NOV. 9, 1912.
1,118,616.
Patented Nov. 24, 1914.
4 SHEETS—SHEET 1.
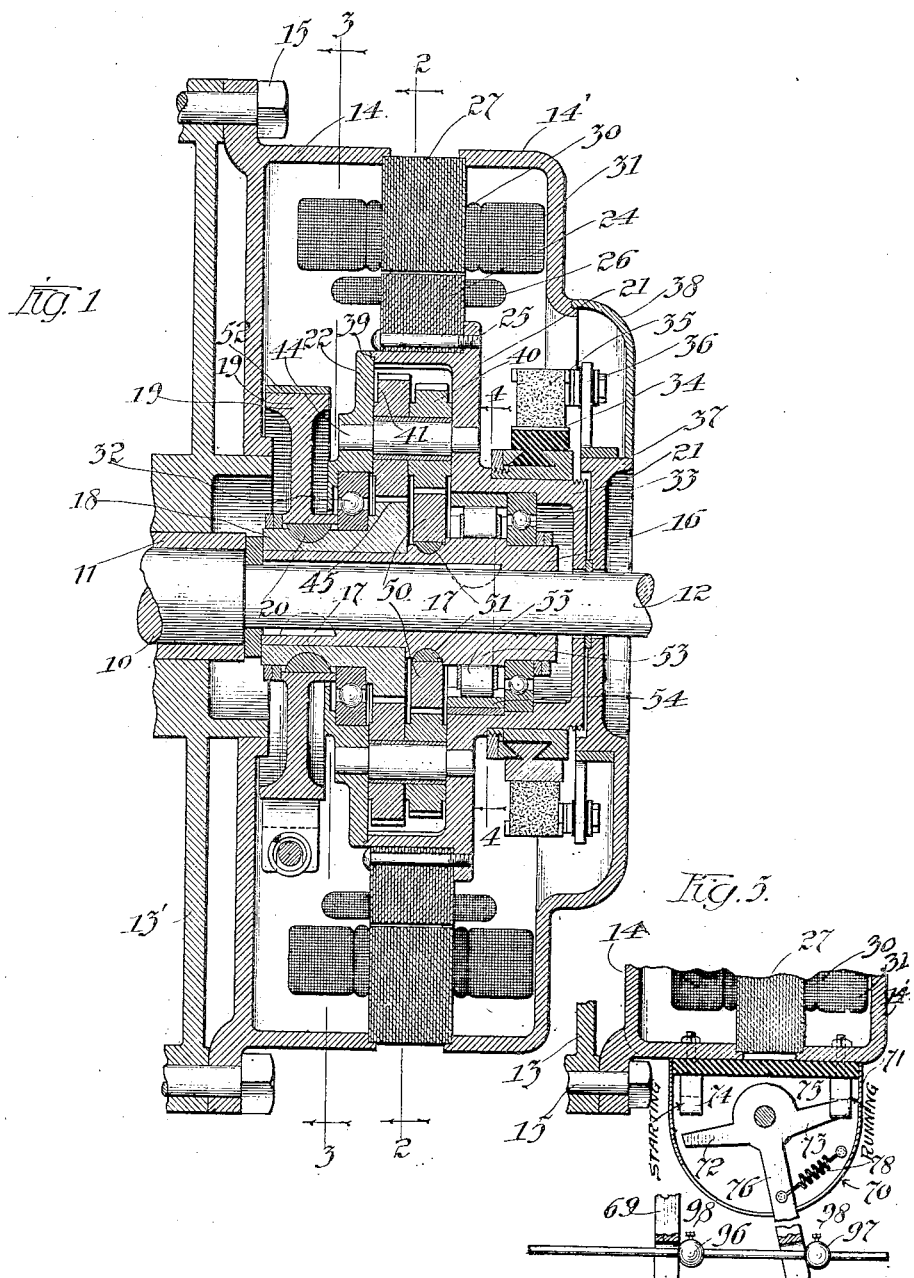

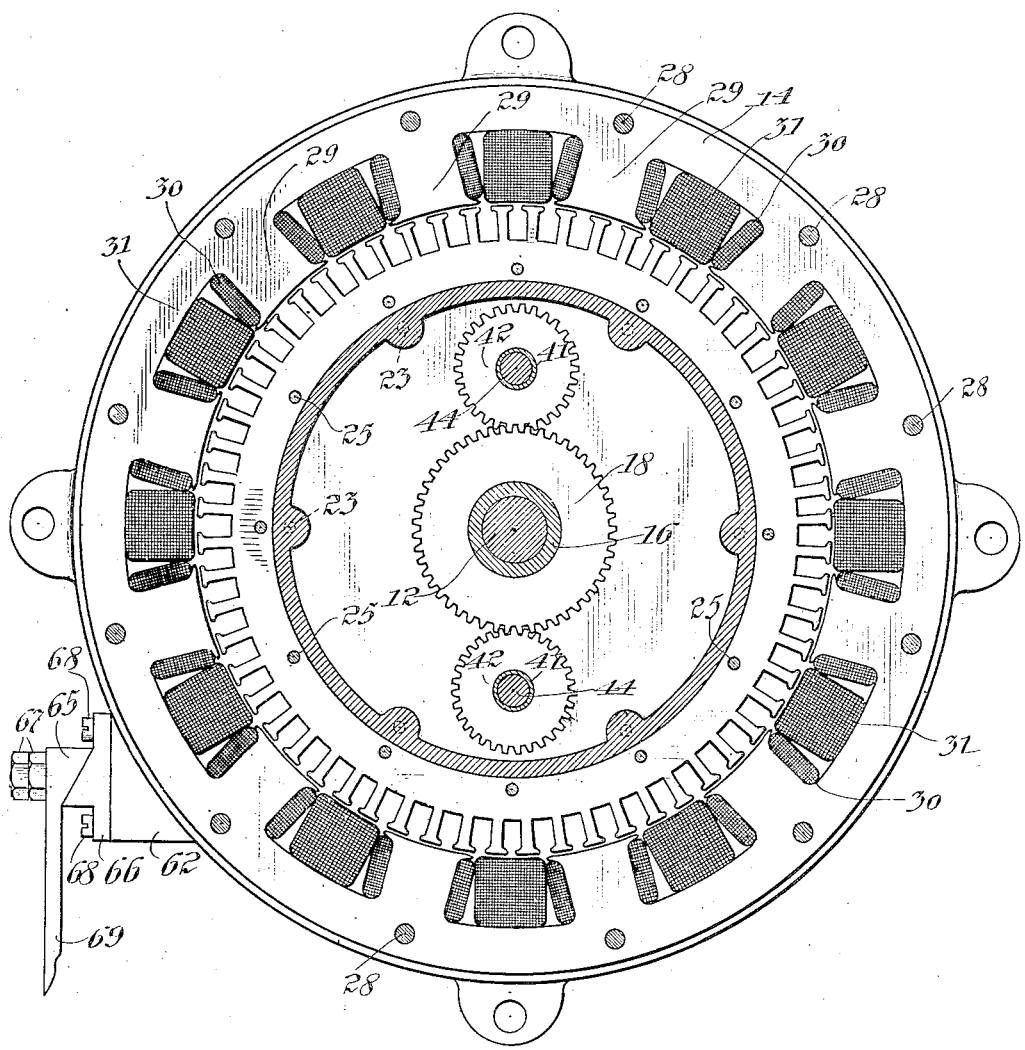

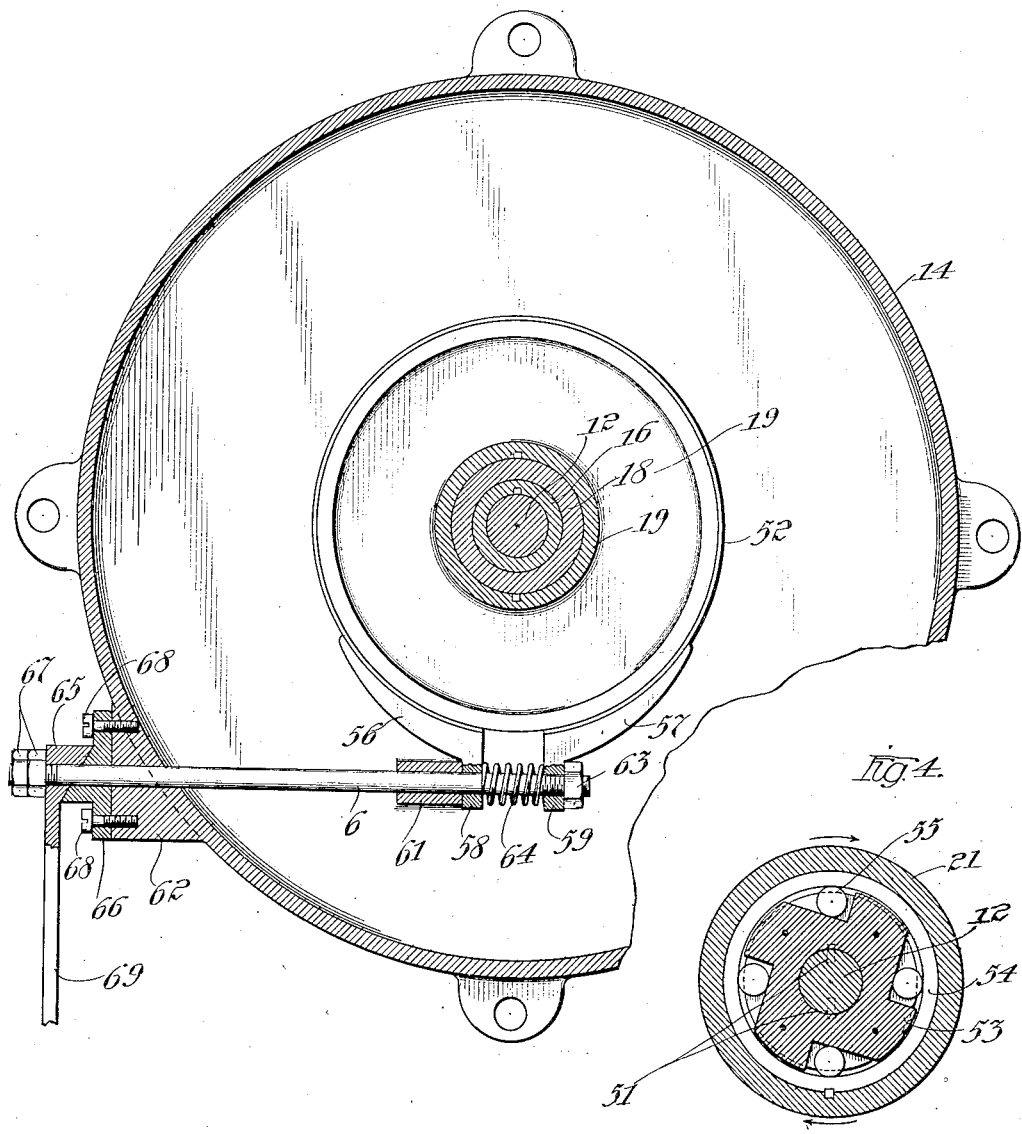

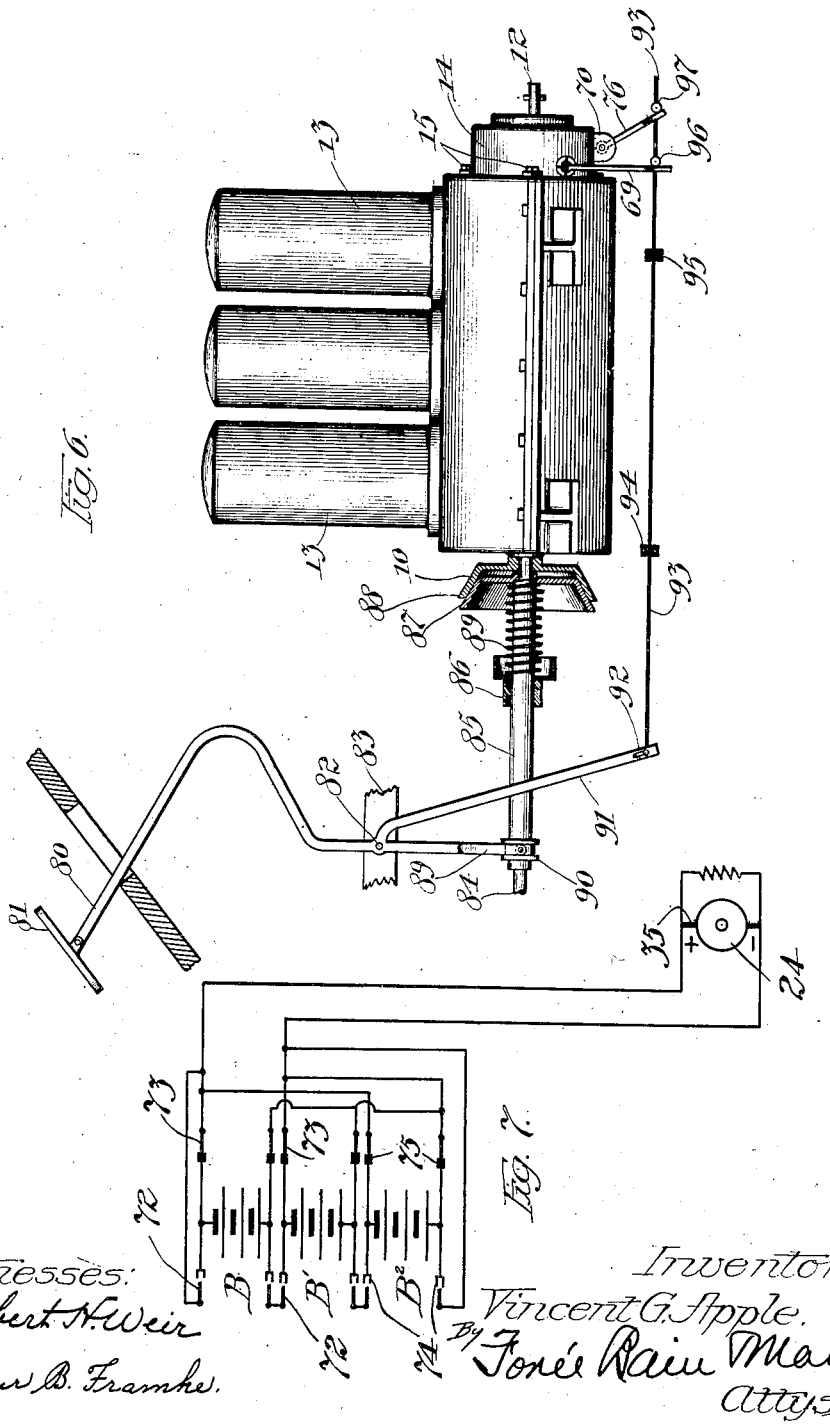

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

POWER-TRANSMISSION DEVICE.

1,118,616.   Specification of Letters Patent.   Patented Nov. 24, 1914.

Application filed November 9, 1912. Serial No. 730,377.

*To all whom it may concern:*

Be it known that I, VINCENT G. APPLE, a citizen of the United States, residing at Dayton, in the county of Montgomery and State of Ohio, have invented certain new and useful Improvements in Power-Transmission Devices, of which the following is a specification.

My invention relates to improvements in equipments for operation and control of internal combustion engines and especially when such engines are used for propelling automobiles, and like vehicles.

One of the objects of my invention is to provide a dynamo electric machine for association with an internal combustion engine whereby it may be used as a motor, to crank, or start, the engine and subsequently as a generator to be driven by the engine to supply electric current for charging a battery and for supplying electric current for lighting, igniting, etc.

Another object of my invention is to provide means whereby the dynamo electric machine may not be used to start the engine, while the engine is connected to the running gear of the vehicle.

Another, and more specific, object of my invention is to provide means for operating an electric switch, which is used to change the electrical functions of the dynamo, to be moved by the foot treadle that is usually employed to operate the main engine clutch that connects and disconnects the engine from the running gear of the vehicle.

Other and further objects of my invention will become readily apparent to persons skilled in the art from a consideration of the following description when taken in conjunction with the drawings, wherein:—

Figure 1 is a central, longitudinal section of a dynamo electric machine and part of an engine; Fig. 2 is a transverse section taken on line 2—2 of Fig. 1; Fig. 3 is a similar section taken on line 3—3 of Fig. 1; Fig. 4 is a similar section taken on line 4—4 of Fig. 1; Fig. 5 is a broken away section showing part of an electric switch for controlling said dynamo elect. ic machine; Fig. 6 is a schematic arrangement for control of the engine dynamo and batteries by movement of the same instrumentality and Fig. 7 is a diagrammatic view showing a simplified form of wiring for connecting the dynamo, batteries and control switch.

In all the views the same reference characters are employed to indicate similar parts.

In the exemplification which I have chosen to employ to illustrate my invention, 10 is an engine shaft, adapted to be rotated by the engine, in the engine bearing 11, and reduced in diameter as at 12, and 13 is an internal combustion engine.

13' is a part of the engine housing carrying the bearing 11, and 14 is the casing for the dynamo electric machine, which is secured to the engine housing by means of bolts 15.

Mounted on the reduced end, 12 of the shaft 10, is a sleeve 16, connected thereto by means of keys 17—17. Loosely mounted on the sleeve 16 and adapted to be freely turned thereon is another shorter sleeve 18. Carried by the sleeve 18 is a brake wheel 19, secured thereto by keys 20.

An armature shell or housing is comprised of two frame parts 21 and 22 secured together, as by bolts 23. The core 24 of the armature, is composed of a plurality of thin iron, annular laminæ, secured to the part 21 by means of screws or bolts 25. The windings 26, of the armature, are secured in slots, radially disposed from the face, as usual in such constructions. A field core, 27, laminated in the same manner is held together by bolts 28 which pass through the parts 14—14' of the casing frame.

In the exemplification shown the field magnet is provided with twelve salient poles 29. A series coil, that is to say, a coil that is connected in series with the windings of the armature, encompasses each of the poles and a shunt coil, that is to say, a coil that is in shunt relation with the armature, is placed in the spaces between the contiguous poles, there being half the number of shunt coils that there are of series coils. The plate 22, of the armature frame, is supported upon the sleeve 18, by the ball bearing 32, and the plate 21, of the armature frame, is supported upon the sleeve 16 by ball bearing 33, so that the armature frame, composed of the parts 21 and 22 may, so far as described be rotated independently of either of the sleeves.

The part 21 of the armature frame, carries a commutator 34 upon which a suitable number of collecting brushes 35 make contact therewith and are supported upon the brush yoke 36 that finds bearing upon a hub 37 of the frame part 14'. A removable plate 38 permits access and inspection of this portion of the dynamo.

For the purpose of clearness I have purposely omitted the wires which are required to connect the various commutator sections with the corresponding armature coils 26, as they form no essential part of my present invention.

Two gear pinions 39 and 40, having different numbers of teeth, and of different diameter, are each fixed to a sleeve 41 by means of keys 42. There may be one or more pairs of these wheels, as desired. The drawings show two pairs. The sleeve 41 is adapted for free rotation on an arbor 44 which is secured to the plate 21 and 22, of the armature frame, thereby providing a rigid and well supported bearing for the gear pinions 39 and 40, within the housing provided by the plates 21 and 22 of the armature frame. The sleeve 18 is provided with an outwardly extending flange 45, upon which are provided the proper number and pitch of gear teeth for meshing with the pinions 39. Fixed to the sleeve 16 is a gear wheel 50 which has driving relation with the gear pinion 40, and is secured to the sleeve 16 as by means of keys 51. This gear wheel turns positively with the shaft 10 and is constantly in mesh with the pinion 40.

Now it is evident that if the armature, and the frame upon which it is carried, be rotated in a given direction, the sleeve 18 and the brake wheel 19 will be thereby rotated in the opposite direction through the geared relation interposed between these parts, assuming, of course, the shaft 10 and the gear wheel 50 to be held stationary. Now it is also evident that if the brake wheel 19 be held stationary, as by a brake band 52, and the armature and frame be rotated in the same direction, as heretofore, the gear wheel 50 and the shaft 10, to which it is attached, will be rotated in the same direction as that in which the armature is moving. If the pinions 39 and 40 were of the same diameter and contained the same number of teeth, then they would simply act as intermediate means for transmitting the power from gear 45 to the gear wheel 50, but inasmuch as there is 1 or 2 more teeth in the pinion 39 than there is in the pinion 40, it will require one entire and complete revolution of the armature to move the gear wheel 50 the distance of one tooth or two teeth, depending upon the relative number of teeth contained in the respective gear wheels 39 and 40.

Now assuming that the armature be turned in clock-wise direction when looking toward the engine, then by the arrangement shown, the gear wheel 50 and the shaft 10 would be rotated in the same direction, but at a much slower speed, probably at a ratio of one to twenty.

A portion 53, of the sleeve 16, constitutes one member of a clutch for connecting the shaft 10 directly with the armature. Another member 54 is secured directly to the frame plate 21, of the armature, and between these members are the clutch rollers 55 adapted for clutching connection between the parts 53 and 54. So long as the part 21 is rotated at a higher velocity than the part 53, the clutch rollers 55 will not engage, but will be moved into the wider portion of the slot, in which they are contained, but as soon as the part 53 of the sleeve, and therefore the shaft 10, is being driven at a higher velocity than the armature frame 21—22, then the rollers 55, will be forced into the narrowest portion of the slot and caused to forcibly connect the armature frame with the shaft. After the motor has been started and the armature has attained sufficient velocity to rotate the shaft 10, at a relatively slow speed, the engine will become self propelling and will immediately rotate the shaft 10 at a speed greater than the speed of the armature and therefore, at this time the rollers 55 will be caused to forcibly engage the armature frame and the armature will thereby be directly connected to the engine shaft 10 without the interposition of the speed-changing gear. When this is done the gear train will be idly rotated with the armature.

For purpose of conveniently tightening the brake band 52, which surrounds the brake wheel 19, I provide lugs 56 and 57 secured to the respective ends of the brake band and each is provided with outwardly turned perforated ears 58 and 59. The shaft 60 passes into the casing 14, through bearing 61, through the ears 58 and 59 and is secured in position by means of a nut 63. It also passes through a lug 62, made on the outer surface of the casting 14 which affords an outboard bearing for the shaft. An open spiral compression spring 64 normally holds the lugs 56 and 57 separated so that the brake band 52 will be only loosely supported upon the brake wheel 19, leaving said wheel normally free. For the purpose of drawing the lugs 56 and 57 close together and thereby tightening the brake band 52, I provide a spiral cam consisting of a movable and a stationary member 65 and 66, respectively, held in normal contact with each other by the nuts 67, which have screw threaded engagement with the rod 60. The stationary member 66 is secured to the lug 62 by means of screws 68 and the rotatable cam member 65 is prolonged into a handle, or lever 69. The normal inactive position of the lever 69 is vertical, and in this position the brake band 62 is obviously loose, but when the arm 69 is moved in either direction from its vertical position the spiral action of the cam composed of the members 65 and 66 will serve to draw the lugs 56 and 57 closer together thereby tightening the brake band, on the brake wheel 69, rendering the brake wheel stationary, as a preliminary operation to starting the motor for the purpose of cranking the engine.

As the dynamo electric machine is to be used in association with suitable storage batteries, for the purpose of energizing the machine and causing it to function as a motor to crank the engine, and to be subsequently used as a generator, to charge the storage batteries and to furnish electric current for other purposes; an electric switch for changing the circuits, to suit the conditions mentioned, is necessary first to be operated. I prefer to operate this switch at the same time that the brake band 52 is tightened upon the brake wheel 19. After the engine has been rotated until it becomes self propelling it is then necessary that this switch should be operated to again change the circuits suitable for the dynamo electric machine when it is operating as a generator. I therefore provide such a switch 70 having a lever provided with bearings in which it is rotated and located on a suitable part of the frame 14 and 14'. The switch is provided with a housing or casing 71 and pivoted diverging switch blades 72 and 73 for engagement with suitable switch clips 74 and 75 respectively. The switch blades 72 and 73 are moved by the handle 76 pivoted as at 77, and normally held in the position shown in Fig. 5, by the spring 78. When the switch parts are in the normal position, shown in Fig. 5, the circuits are suitable for association with the dynamo electric machine, and the storage batteries, with which it is connected, to operate as a generator and when the switch is thrown into the opposite position, that is to say, when the contacts 72 and 74 are brought into electrical connection, and the contacts 73 and 75 are broken, the circuits are in proper association with the dynamo electric machine and batteries for the purpose of causing the said dynamo to operate as a motor.

In Fig. 7 I have shown diagrammatically, a simple form of wiring illustrating the function of a control switch. The batteries, B, B' and B² are connected in series with the dynamo when the switch points 72, 74 contact and thus operates as a motor under the total voltage of the cells. When the dynamo is to be operated as a generator, the switch points 73, 75 are made to contact and the batteries B, B' and B² are then connected in parallel with the machine.

It is of considerable advantage to provide a single mechanism which will automatically and simultaneously operate the switch and the brake, for the purpose of applying the brake, as a preliminary to starting the motor, and which will automatically release the brake and throw the switch to proper position, at the time that the brake is released, so as to change the circuits, between the dynamo and batteries, suitable for the operation of the dynamo, as a generator. It is further desirable to have the engine of the automobile disconnected from the running gear, at the time it is being started, or cranked by the motor, so as not to impose too great a load upon the motor and the batteries at the time of starting. I therefore provide a single means for operating the switch and the brake after effecting driving engagement of the main engine clutch, which is used for connecting the engine with the running gear of the vehicle, so that these various functions are performed in an automatic manner, without the direct supervision of the operator, and to this end I provide a clutch lever 80 having on its free end a foot treadle 81, which lever is pivoted as at 82 to a part of the frame 83.

A shaft 84, is designed to be connected to the running gear of the vehicle, and carries a sleeve 85 which has bearing in a portion of the frame 86. The sleeve, 85 is rotatably fixed with the shaft 84, but is free for longitudinal movement thereon and at one end carries a clutch member 87 adapted for frictional coöperation with a similar clutch member 88 connected to the shaft 10. An open spiral compression spring 89, normally holds the clutch members 87 and 88 in clutching association, so that the shaft 10 may directly drive the shaft 84, and when the clutch members 87 and 88 are separated, as by application of pressure upon the treadle 81, the engine shaft 10 is free to rotate without the impediment imposed upon it by the shaft 84.

An arm 91, is connected to the lever 80, as at 82, and is connected as at 92, to a horizontally-disposed rod 93, which is supported in bearings 94 and 95. The rod is supplied with longitudinally adjustable stops 96 and 97 that may be secured in selected positions, by means of the set screws 98.

The operation of the device is as follows: When the pedal 81 is depressed, the sleeve 85 is moved longitudinally on the shaft 84, against the resilient action of the spring 89, and the clutch members 87 and 88 are thereby separated, and by this means the engine is disconnected from the running gear of the vehicle. At the same time the arm 91 is moved toward a rearward position, moving the rod 93 longitudinally thereby. Further pressure on the treadle, after engagement of the clutch members compresses the spring 89 to a greater degree and moves the brake lever 69 out of its normal vertical position whereby the brake band 52 is tightened upon the brake wheel 19, and at the same time it moves switch arm 76 to positions whereby the switch blades 72 and the cooperating switch clips are brought into electrical contact, thereby arranging the circuits, between the storage battery and the dynamo electric machine suitable for operation of the latter as a motor. The stops 96 and 97 are the means by which the levers 69 and 76 are respectively moved, and sufficient lost motion may be provided by the position of the stops on the rod, as shown, to cause the movement of the brake lever and the switch lever after the clutch parts have been moved into positions of engagement. After the engine shaft 10 has been rotated, by the operation of the dynamo electric machine as a motor, and it becomes desirable to connect said engine to the shaft 84, for the purpose of driving the running gear of the vehicle, pressure is released from the pedal 81, when the parts will resume the positions shown in Fig. 6. After the restraint has been removed from the lever 80, in a manner described, the spring 78, of the switch 70, will automatically move the switch lever 76 to the normal running position whereby the circuits have been changed appropriately for operation of the dynamo electric machine as a generator, because it is now being driven by the engine. By this means it will be impossible to drive the entire vehicle by the operation of the motor, as the switch 70 cannot be properly thrown and the brake cannot be applied to the gear-changing mechanism unless the engine has first been disconnected from the running gear, and therefore the batteries cannot be burdened with an overload, which under the circumstances, would be so great as to cause the battery plates to buckle and the conductors of the motor to overheat to a dangerous extent.

Of course it is evident that the brake lever 69 and the switch lever 76 could be coincidentally moved, in a manner described, without the associate movement of the clutch members 87 and 88, but under the circumstances the full advantages of my invention, just referred to, would not be obtained.

From the foregoing descriptions, and by reference to the drawings, it is evident that the engine shaft 12 may be manually rotated, by the usual crank, and the engine thus started, in cases of emergency, quite independently of the dynamo electric machine and its associated parts and without the necessity of making any changes or adjustments necessary for accomplishment of these results.

I have illustrated and described in this application a particular form of gearing and dynamo which forms no part of the present case but is the subject matter of an application entitled Improvements in gearing, filed by me December 16, 1912, Serial No. 736,954.

While I have herein shown and described a single embodiment of my invention, for the purpose of clear disclosure, it is evident that many changes may be made in the specific structure without departing from the spirits and scope of the appended claims.

What I claim is:

1. In an equipment of the character described, the combination with an internal combustion engine; a dynamo electric machine; a storage battery; connections therebetween; gearing interposed between said engine and dynamo for driving the engine at a reduced speed when the dynamo acts as a motor, means for establishing a positive connection between the engine and dynamo, when the latter acts as a generator; a switch for connecting said dynamo to said battery appropriately for operation as a motor; and means for simultaneously causing the engagement and disengagement of said gearing and movement of said switch.

2. In an equipment of the character described, the combination with an internal combustion engine; of a dynamo electric machine; a clutch for directly connecting said engine and dynamo when the shaft of the former is moving at a higher rate of speed than that of the latter; a storage battery; circuit connections between said battery and dynamo electric machine; speed-changing gearing adapted for interposition between said engine and dynamo; a switch, for alternatively connecting said dynamo to said battery appropriately for its operation as a motor, or generator; and means for simultaneously causing the engagement and disengagement of said gearing and the movement of said switch and the alternative engagement and disengagement of said directly connecting clutch.

3. In an equipment of the character described, the combination with an internal combustion engine; a shaft for connection with a running gear of a vehicle; a main clutch for connecting and disconnecting said engine and shaft; a dynamo electric machine for connection to said engine; speed-changing gear for interposition between said engine and said dynamo; controlling means for said gear; a battery; circuit connections, for connecting said battery and dynamo in suitable relation as a motor, or as a generator; a switch, for controlling said connections and a single instrumentality for moving and controlling said main clutch, gear controlling means, and said switch.

4. In an equipment of the character described, the combination with an internal combustion engine; a shaft for connection with a running gear of a vehicle; a main clutch for connecting and disconnecting said engine and said shaft; a dynamo electric machine for connection to said engine; a battery; circuit connections, for connecting the battery and dynamo in suitable relation as a motor, or as a generator; a switch for controlling said connections and a single instrumentality for moving and controlling engagement of said main clutch members and for subsequently controlling said switch.

In testimony whereof I hereunto set my hand in the presence of two witnesses.

VINCENT G. APPLE.

In the presence of—
 FORÉE BAIN,
 MARY F. ALLEN.